United States Patent
Stevens et al.

(10) Patent No.: US 9,464,910 B2
(45) Date of Patent: Oct. 11, 2016

(54) NAVIGATION SYSTEM WITH WEB INTERFACE

(75) Inventors: Roger Stevens, Lucas, TX (US); Ryan Stevens, Lucas, TX (US); Marc Brian Ruskin, Commerce Township, MI (US)

(73) Assignee: NAVIGATION SOLUTIONS, LLC, Plano, TX (US)

( * ) Notice: Subject to any disclaimer, the term of this patent is extended or adjusted under 35 U.S.C. 154(b) by 1208 days.

(21) Appl. No.: 11/848,496

(22) Filed: Aug. 31, 2007

(65) Prior Publication Data

US 2009/0063037 A1    Mar. 5, 2009

(51) Int. Cl.
G01C 21/00 (2006.01)
G01C 21/36 (2006.01)

(52) U.S. Cl.
CPC ....... *G01C 21/3611* (2013.01); *G01C 21/3679* (2013.01)

(58) Field of Classification Search
CPC .......... G01C 21/3647; G01C 21/3679; G01C 21/3682; G01C 21/3688; G06Q 10/02; G06Q 10/107
USPC ........................................................ 701/207
See application file for complete search history.

(56) References Cited

U.S. PATENT DOCUMENTS

| | | | |
|---|---|---|---|
| 5,948,040 A * | 9/1999 | DeLorme et al. | 701/201 |
| 6,128,482 A * | 10/2000 | Nixon et al. | 455/414.1 |
| 6,278,940 B1 * | 8/2001 | Endo | 701/209 |
| 6,349,257 B1 * | 2/2002 | Liu et al. | 701/200 |
| 6,360,167 B1 * | 3/2002 | Millington et al. | 701/211 |
| 6,826,472 B1 * | 11/2004 | Kamei et al. | 701/202 |
| 2001/0054087 A1 * | 12/2001 | Flom et al. | 709/218 |
| 2002/0042819 A1 * | 4/2002 | Reichert et al. | 709/217 |
| 2002/0183924 A1 * | 12/2002 | Yokota | 701/209 |
| 2003/0065805 A1 * | 4/2003 | Barnes, Jr. | 709/231 |
| 2003/0069690 A1 * | 4/2003 | Correia et al. | 701/211 |
| 2004/0059705 A1 * | 3/2004 | Wittke et al. | 707/1 |
| 2006/0173841 A1 * | 8/2006 | Bill | 707/6 |
| 2007/0016368 A1 * | 1/2007 | Chapin et al. | 701/211 |
| 2008/0040024 A1 * | 2/2008 | Silva | 701/200 |
| 2008/0082262 A1 * | 4/2008 | Silva et al. | 701/211 |
| 2008/0243370 A1 * | 10/2008 | Loera et al. | 701/201 |
| 2009/0063037 A1 * | 3/2009 | Stevens et al. | 701/207 |

* cited by examiner

*Primary Examiner* — Redhwan k Mawari
(74) *Attorney, Agent, or Firm* — Carlson, Gaskey & Olds, P.C.

(57) ABSTRACT

A user can selectively download complete databases of selected favorite chains (or other selected destinations or collections of destinations) from a server and store them on a portable media device. The user can also create his own address book with locations that he selects. The user can also create trip plans, containing locations selected by the user that are associated with specific trips. The address books and trip plans can also be stored on the portable media device. The user can then access the portable media device with the navigation system to select destinations stored there. The destinations are both more efficiently accessible by the user and more up to date, since the information on the server can be updated more frequently.

26 Claims, 8 Drawing Sheets

Fig-8

| Home | Plan Trip | Address Book | Favorites | Tutorial | FAQ |

Trip Plan - Add a Destination

Select Search Start/End Point

START POINT
Trip Locations
[LAX - 9000 Airport Road ▼] — *106*
OR
Address or Intersection
[ ]
City
[ ]
State/Province
[Choose ▼]
Country
[Choose ▼]

END POINT — *108*
Trip Locations
[4010 E. 26th St. ▼]
OR
Address or Intersection
[ ]
City
[ ]
State/Province
[Choose ▼]
Country
[Choose ▼]

[Search]

[Back]

| Home | Plan Trip | Address Book | Favorites | Tutorial | FAQ |

Trip Plan - Add a Destination

Corridor Search

Destination Name
[ ] — *110*

Find point of interest
Type [Restaurant ▼] — *112*
[Cuisine Type (optional) ▼] — *114*
Corridor Width [4 miles ▼] — *116*
Matches [10 matches ▼]
Show Map [✓]

[Search]

[Back]

NAVIGATION SYSTEM WITH WEB INTERFACE

BACKGROUND OF THE INVENTION

The present invention relates generally to navigation systems and more particularly to a navigation system providing a web interface to a user.

Vehicle navigation systems generally include one or more sensors, such as a GPS sensor, indicating the present position of the vehicle relative to a map database of roads. The navigation system typically includes a database of points of interest (POI) to which the user can choose to be routed, such as restaurants, hotels, etc.

Current POI databases are very dynamic and it is difficult to keep navigation systems updated with complete and accurate data. This problem is compounded in a fleet application such as rental cars because the vehicles are not easily accessible to perform frequent updates.

There are several reasons that POI databases become outdated. Establishments open and close frequently. Establishments have address or phone number change. POI listings can have data entry errors that need to be corrected. Sometimes POI categories are assigned to the POIs inconsistently and need to be corrected.

Currently in order to find a POI in a navigation system, the user may first select a category, such as "restaurants." The user may further limit the search by choosing a city. The user then begins entering the first few letters of the name of the desired destination. When the user has entered enough characters so that the list is a manageable length, a list of destinations meeting the search criteria is displayed to the user. The user then picks the desired destination from the list.

The current user interface has several potential drawbacks. First, sometimes the user is unsure to which point of interest category the desired destination belongs. Thus, the user may have to try more than one point of interest category. Second, the user may be unsure of the correct spelling of the point of interest name.

SUMMARY OF THE INVENTION

In the navigation system according to one embodiment of the present invention, a user can selectively download complete databases of selected favorite chains (or other selected destinations or collections of destinations) from a server and store them on a portable media device. The user can then access the portable media device with the navigation system to select destinations stored there. The destinations are both more efficiently accessible by the user and more up to date, since the information on the server can be updated more frequently.

Providing the user with custom specialized POI databases via the internet greatly increases the accuracy of the database content and reduces the significance of the time sensitivity factor plaguing existing POI databases. Typical POI databases are built assigning a category identifier to each POI record in the database. The specialized approach focuses on segregating the data by franchise chain name or special event. For example, instead of a generic 'hotel' category, a database containing only Marriott locations can be downloaded for use in the navigation system.

In addition, special event databases would contain destinations related to events such as Super Bowl, PGA tour events, NASCAR races, trip along Route66, East coast historical attractions, etc. Within a special event file, destinations may be subcategorized to assist the user in traversing the destinations. All of these databases will be accessible via the internet. The wide availability of the internet allows users to download the latest available data taking the vehicle update status out of the critical path.

These and other features of the present invention can be best understood from the following specification and drawings, the following of which is a brief description.

BRIEF DESCRIPTION OF THE DRAWINGS

FIG. 8 illustrates a screen for selecting starting and ending points for a corridor search of points of interest.

FIG. 9 illustrates a second screen for performing a corridor search.

DETAILED DESCRIPTION OF THE PREFERRED EMBODIMENT

Figure 1:
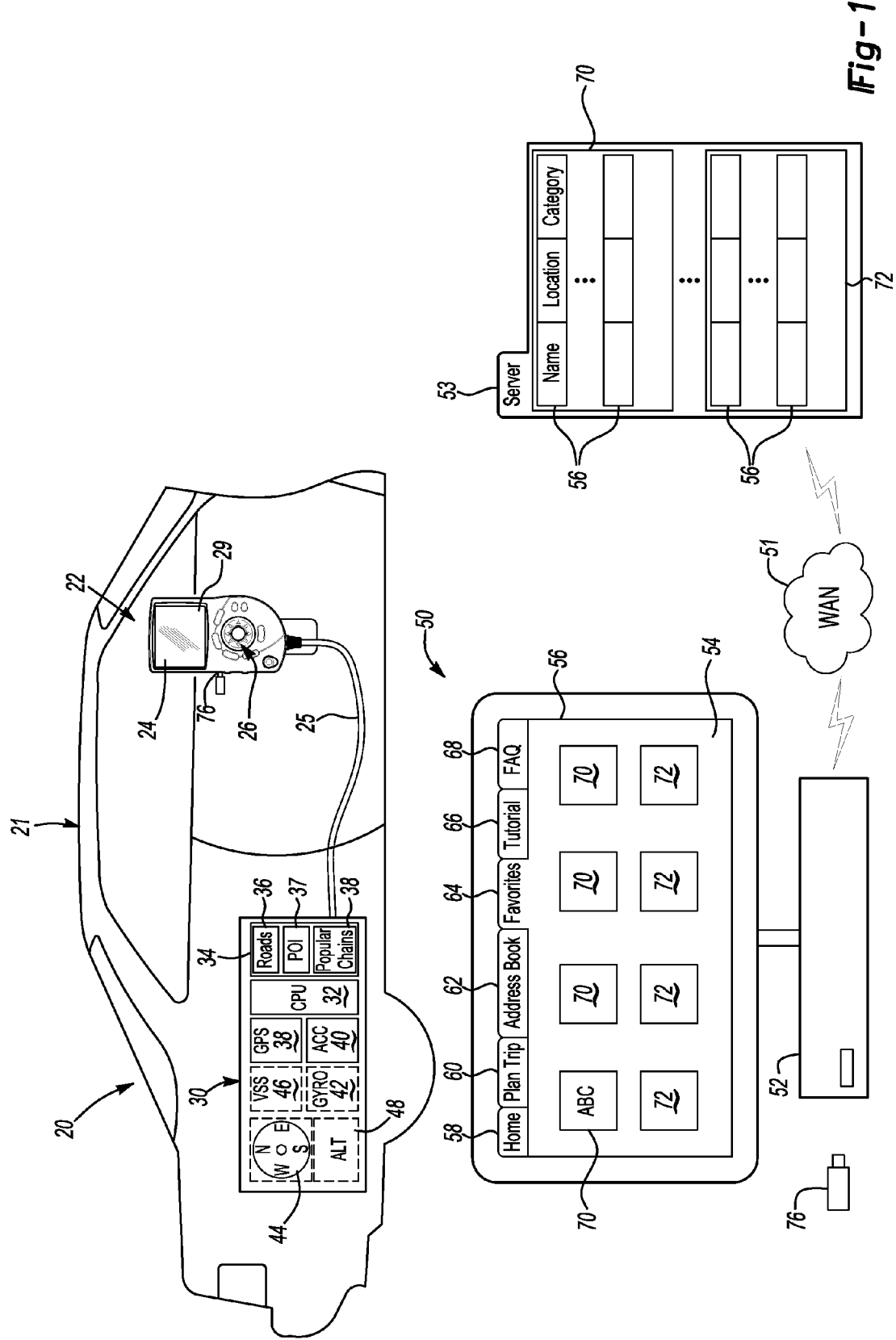
FIG. 1 schematically illustrates a navigation system according to one embodiment of the present invention installed in a vehicle and a remote user interface for interacting with the navigation system.

A navigation system 20 according to one embodiment of the present invention is shown schematically in FIG. 1 installed in a vehicle 21. Although the present invention could be used in any navigation system, it is particularly suited for navigation systems 20 that are installed in rental cars. The navigation system 20 includes a user interface module 22 having a display 24 and a user input device 26. The user input device 26 can include a directional input device. Alternatively, the display 24 can be a touch screen display and/or voice recognition. The user interface module 22 further includes a speaker 29.

The user interface module 22 is connected either wirelessly or via cable 25 to the main module 30. The main module 30 includes a CPU 32 having a processor and memory, such as RAM or other electronic storage. The CPU 32 is programmed to perform the functions described herein. The CPU 32 is connected to storage 34, which could also be electronic storage, or a hard drive, cd-rom, dvd or any electronic, optical, magnetic or other storage device. Storage 34 includes a map database of roads 36 and a database of points of interest 37.

The database of points of interest 37 includes at least the names, locations and categories (e.g. restaurant, hotel, etc.) of all the points of interest in a given area (e.g. North America). The storage 34 further includes a database of popular chains 38, which is a subset of the points of interest in database of points of interest 37. The entries in the database of popular chains 38 include only well known, common, popular, or otherwise selected chains or franchises from the database of points of interest 37. The databases 36, 37, 38 could each be in separate databases or the databases 36, 37, 38 could be contained in a single database.

The main module 30 further includes one or more sensors used by the CPU 32 to determine the present position of the vehicle 21 relative to the map database of roads 36. Some example sensors include: a GPS receiver 38, an accelerometer 40, a gyro 42, a compass 44, a vehicle speed sensor 46, and an altimeter 48. Any or all of these or other sensors could be used, as the present invention is independent of the specific underlying position-determination technology.

A remote computer 50, such as a home personal computer having a CPU 52 and display 54, is connected via a wide area network 51, such as the internet, to a central server 53 (to which many like computers 50 are connected). A first user interface provided from server 53 via the wide area network 51 is shown on the display 54. The user interface screen includes a plurality of tabs that can be selected, including a home tab 58, a plan trip tab 60, an address book tab 62, a favorites tab 64, a tutorial tab 66 and an FAQ tab 68.

In FIG. 1, the "favorites" tab 64 is illustrated. In the favorites tab 64, a plurality of chain icons 70 and a plurality of specialty icons 72 are displayed. The chain icons 70 each represent a different logo or name of a popular chain. In this context, the term "chain" refers to a plurality of points of interest that share a brand, such that users would expect to find a certain level of quality of goods or services at locations with that brand. This includes locations that are all commonly owned and those that are operated under franchise agreements or other arrangements. The chain can be a local chain, regional chain, national chain or a worldwide chain.

The specialty icons 72 each include a logo and/or text representing a special event, such as a particular sporting event (such as the Super Bowl, PGA Tour Events, NASCAR Races, etc.) or conventions, concerts or other special events. These points of interest could include the location of the event itself, locations of related events (celebrations, speeches, etc), sponsoring businesses (such as hotels, restaurants, etc) or regional points of interest for visitors to explore while they are in town for the event. Other specialty icons 72 may represent collections of points of interest in a certain region that are not time-limited, such as popular trips, regional historical attractions, etc.

On the server 53, each of the icons 70, 72 is associated with a plurality of points of interest 56, each of which may or may not already be stored individually along with thousands and thousands of other points of interest in the points of interest database in the main module 30. The points of interest 56 may each include information indicating the name, location and POI category. By providing these collections of points of interest that the user can select with their own computer 50 prior to travel and prior to obtaining the rental car 21, the search for the points of interest or collections of points of interest is much more convenient in the navigation system 20. The database on the central server 53 is also much more easily updated frequently. The user interface on the user's computer 50 is larger and easier to use than that on the user interface module 22. Further, the user typically has more time at home before their travel to select points of interest.

When the user selects one of the icons 70, 72 the associated points of interest 56 may optionally first be displayed to the user. The user can select to download that collection of points of interest to their computer 50 or to a portable media device 76, such as a USB key, compact flash card, SD card, or any other magnetic, electronic, optical or other portable storage media.

Then, when the user brings the portable storage media 76 to the vehicle 21, the user can access the selected collections of points of interest with the user interface module 22. The user can then choose one or more points of interest from the portable storage media 76 using the user interface module 22. The user can then choose to be guided to the selected point of interest by the navigation system 20.

Figure 2:
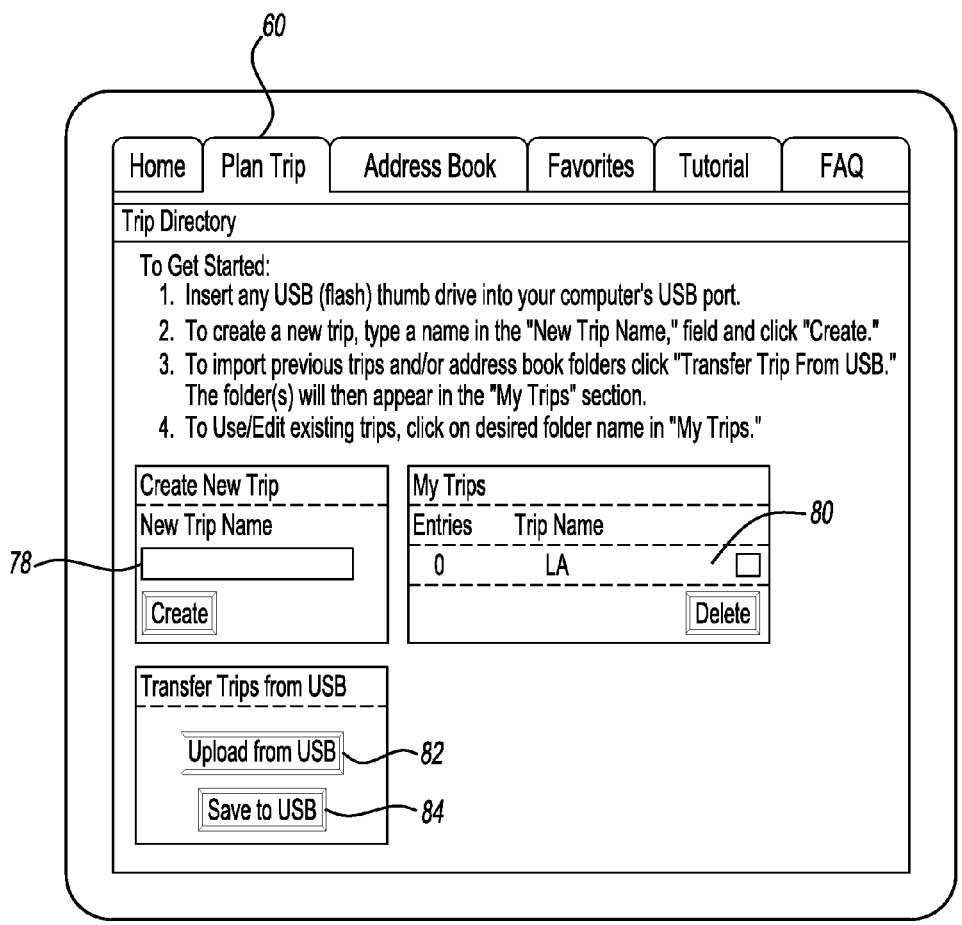
FIG. 2 shows a second user interface screen for the remote computer of FIG. 1.

FIG. 2 illustrates the "plan my trip" tab 60 on the user's computer 50. With the "plan my trip" tab 60, the user can create a trip file, including creating a new trip name in trip name field 78. More than one trip can be created and displayed on the my trips list 80. The user can save the trips to the portable storage media 76 (FIG. 1) with the save button 84 or upload previously saved trips from the portable storage media 76 with upload button 82.

Figure 3:
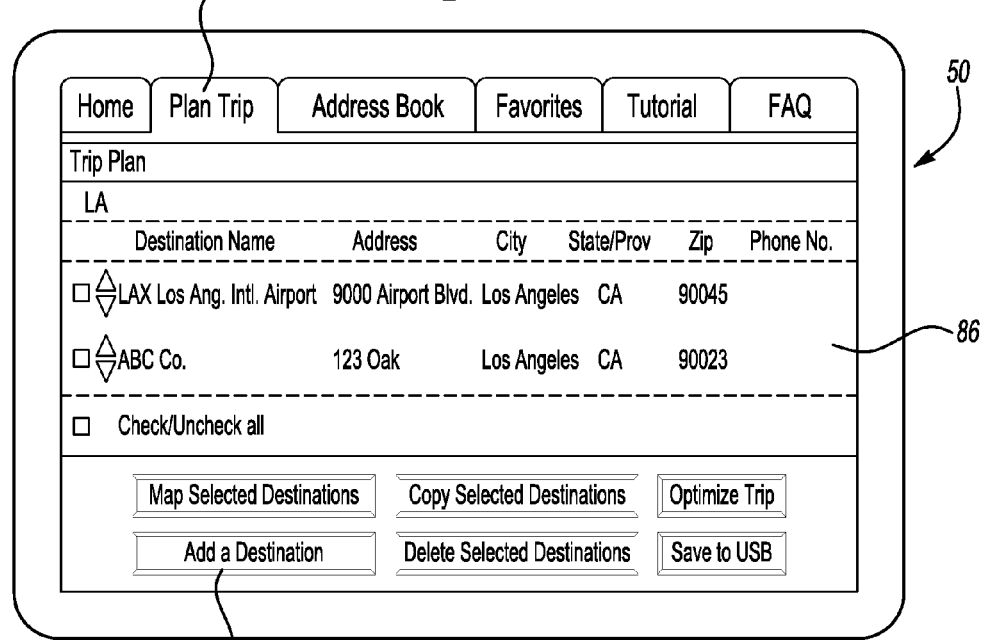
FIG. 3 illustrates a trip plan screen.

Upon selecting one of the trips in the my trips list 80, the trip plan screen of FIG. 3 is displayed. The trip plan includes a list 86 of points of interest in sequence. The user can modify this sequence of the points of interest on the list 86 with the up and down arrows. By selecting the "add a destination button" 87, the user is presented with the "add a destination" screen of FIG. 4.

Figure 4:
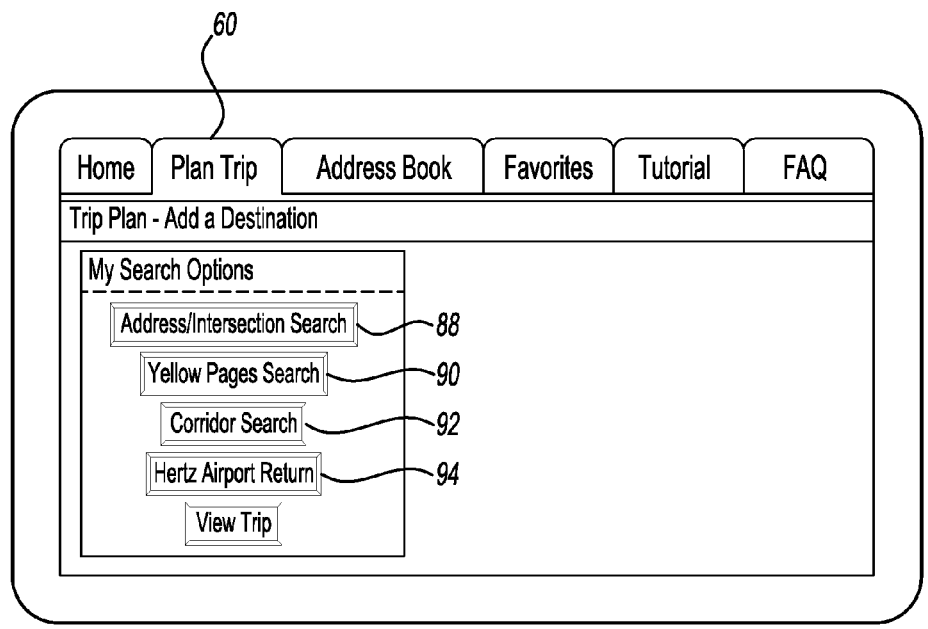
FIG. 4 illustrates a screen for adding a destination to the trip plan of FIG. 3.
Figure 5:
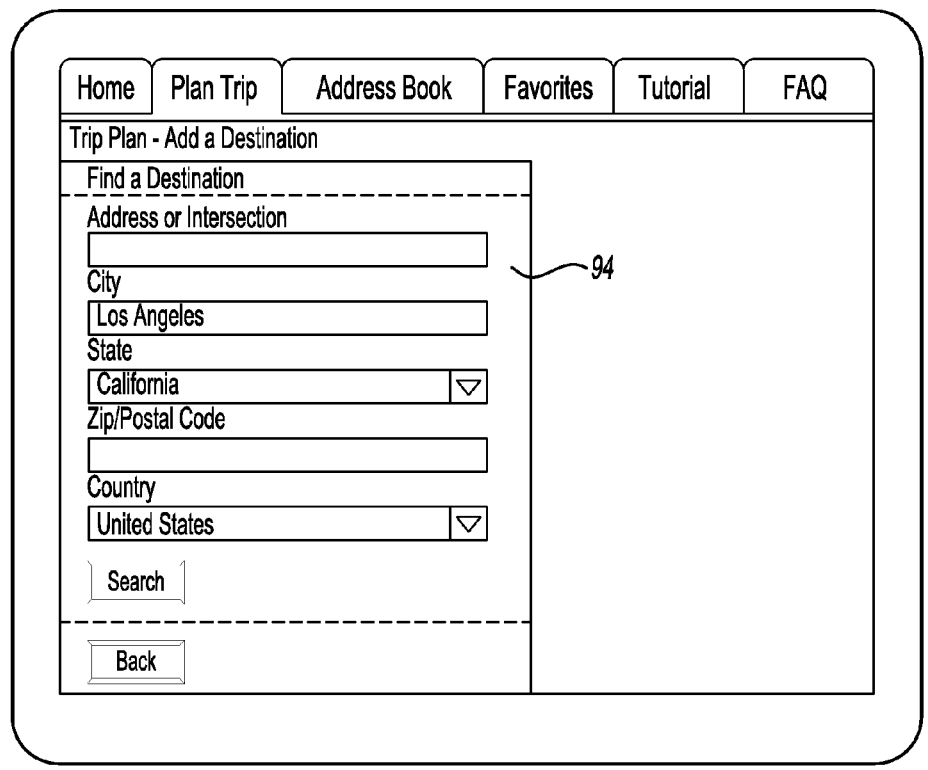
FIG. 5 illustrates a screen for inputting an address or intersection destination.

Referring to FIG. 4, the user can add a destination by selecting the address/intersection button 88, the yellow pages button 90, performing a corridor search with the corridor search button 92, or by selecting a list of rental car airport return locations with button 94. If the user chooses to add a destination via the address/intersection button 88, the user is presented with the address/intersection screen of FIG. 5. The user can enter an address in the field 94, which becomes a destination added to the trip plan of FIG. 3.

Figure 6:
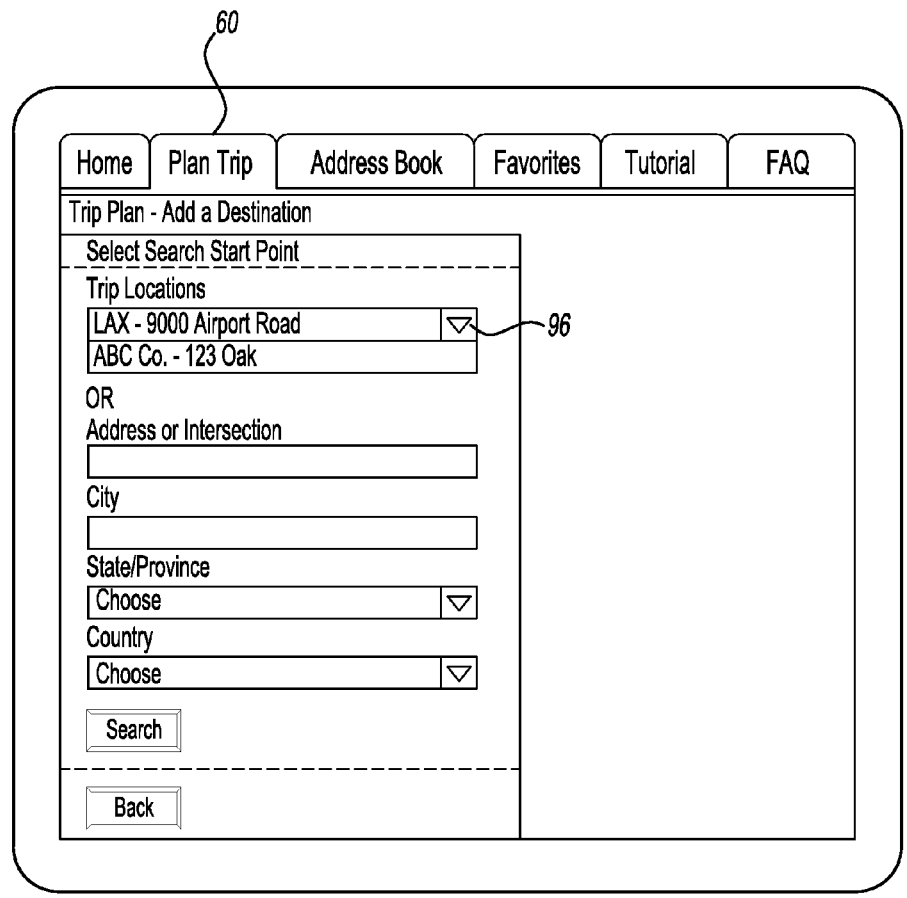
FIG. 6 illustrates a screen for selecting a starting point for a yellow pages search.
Figure 7:
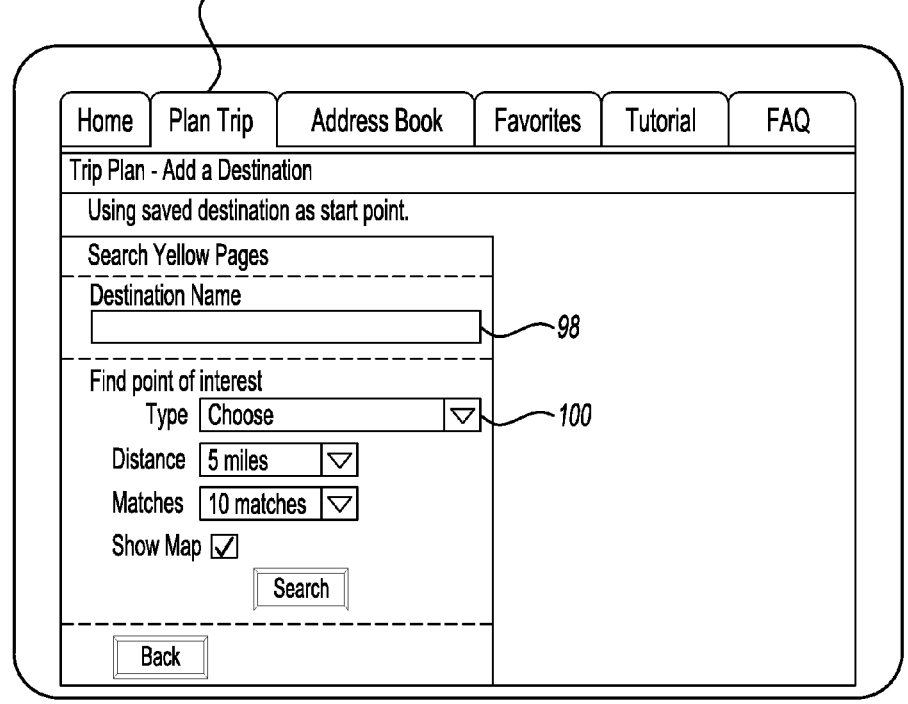
FIG. 7 illustrates a screen for searching for a point of interest in a yellow pages search.

If a user selects the yellow pages button 90 from the screen of FIG. 4, then the user is presented with the screen of FIG. 6. The user selects one of the trip destinations from pull down menu 96 or enters an address or intersection as a starting point for the search. In FIG. 7, the user searches a name of the point of interest with destination name field 98 and/or chooses a point of interest category from pull down POI menu 100 (such as airports, ATM, hotels, restaurants, etc). A list and/or map (not shown) of points of interest meeting the search criteria is displayed, from which the user selects one or more points of interest to add as destinations to the trip plan.

Figure 10:
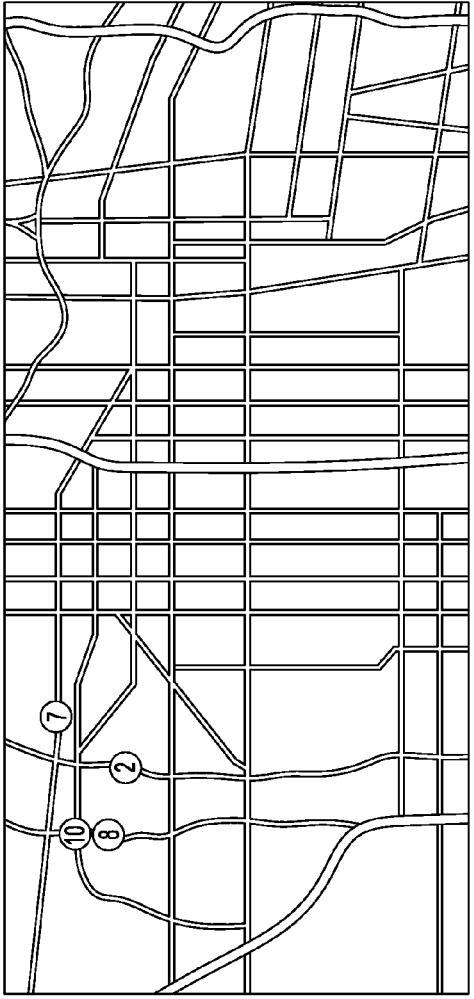
FIG. 10 illustrates results of a corridor search.

If a user selects the corridor search button 92 in FIG. 4, the user is presented with the screen of FIG. 8. The user then selects one of the trip locations from pull-down menu 106 or enters an address or intersection as a starting point. The user also selects one of the trip locations from pull-down menu 108 or enters an address or intersection as an end point. This corridor is further defined in terms of width in the screen shown in FIG. 9 by width field 116. The user can search the corridor by destination name (destination name field 110) and/or POI category field 112 (with an optional POI sub-category field 114). The search results are provided in a screen similar to that of FIG. 10, in which a plurality of matching points of interest are displayed in a list 118. The user can select one or more points of interest to add to the trip plan.

Figure 11:
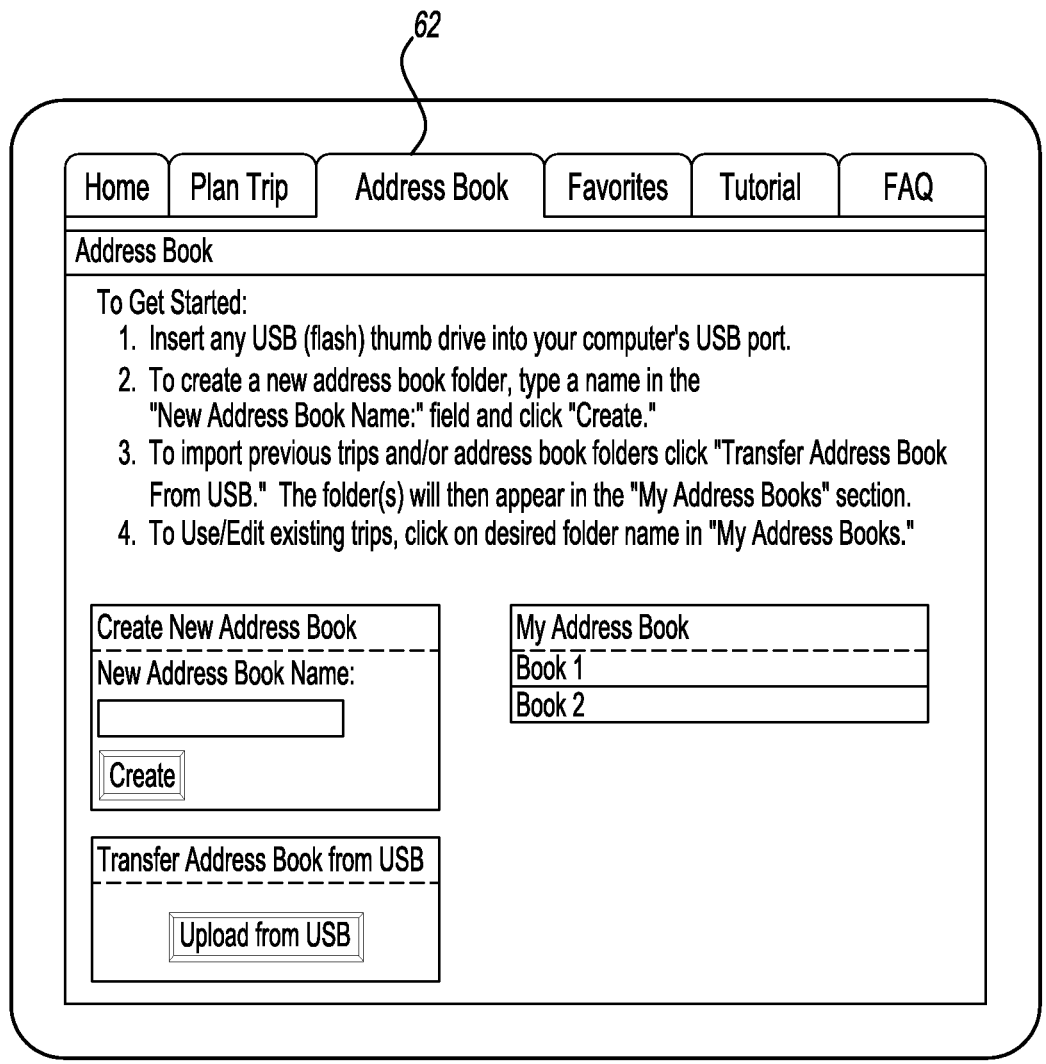
FIG. 11 illustrates an address book screen.

Under the address book tab 62, shown in FIG. 11, the user can add individual destinations to one or more address books using the same interfaces of FIGS. 4-10. The distinction between the address books and the trips is merely conceptual: the address books are intended to be permanent personal collections of relevant addresses that may be used by the address book's owner, while the trip plans are intended to be one-time use collections of destinations associated with a particular trip.

Figure 12:
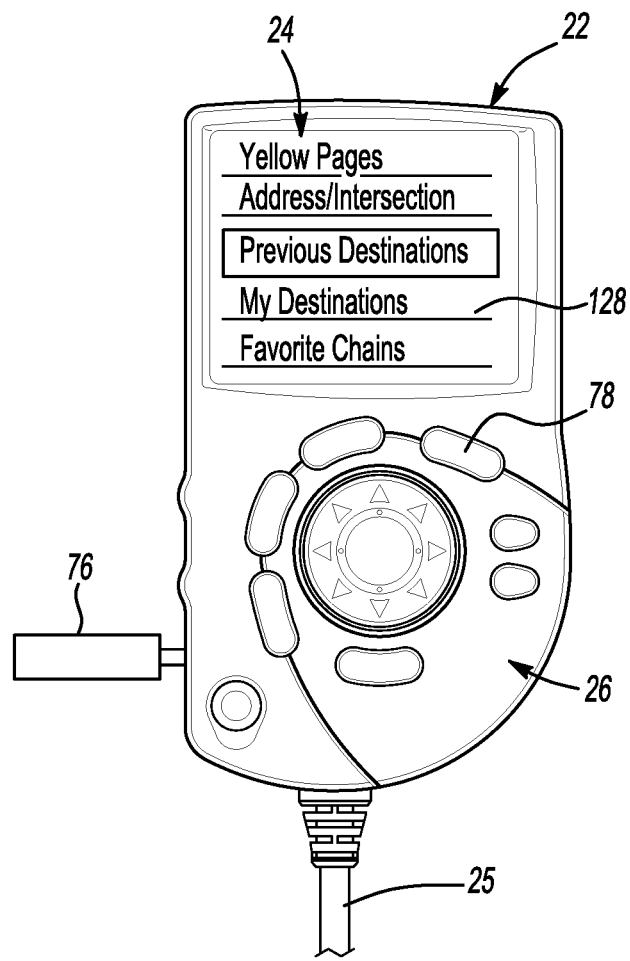
FIG. 12 illustrates the user interface module of FIG. 1 with a screen for selecting destinations from the portable media device.

After all of the address books and trip plans have been saved to the portable media device 76, the user carries the portable media device 76 to his own vehicle navigation system 20, or more significantly, to a navigation system 20 in a rental vehicle 21 when traveling, particularly when the user has flown to a distant, strange city. The user will connect the portable media device 76 to the navigation system 20 in the vehicle 21 as shown in FIG. 12. From the display 24 shown in FIG. 12, the user can conveniently access the destinations stored on the portable media device 76. For example, the user can access the destinations in the address books and trip plans by choosing "my destinations" 128 from the menu.

The user can also access the points of interest in the favorite chains that he downloaded from the screen in FIG. 1. The user first chooses one of the chains that he downloaded, then accesses a list of points of interest of that chain, including searching only that list by location. With a significantly reduced database size, the desired destination is much easier to locate quickly in the user interface 22.

If the user has downloaded lists of POIs associated with special events or other collections of points of interest (from icons 72 in FIG. 1), he can choose one of the icons 72 on display 24 (or one of the entries on a text list of the events and collections). The user then scrolls through the list of POIs associated with that event or collection and chooses a POI for the navigation system to route to.

However the user chooses a destination, the navigation system 20 then routes the user to the selected destination, based upon the sensors (e.g. sensors 38, 40, 42, 44, 46, 48), and map database 36 as is commonly known in navigation systems.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for operating a navigation system including the steps of:
    a) connecting to a remote server over a network;
    b) selecting from among a plurality of collections of related points of interest (POIs), wherein each POI is associated with a specific physical location;
    c) downloading the selected collection of related POIs with specific physical locations from the remote server without determining a route;
    d) accessing the downloaded collection with a navigation system; and
    e) choosing one of the related POIs in the downloaded collection so that the navigation system routes to the specific physical location of the chosen POI.

2. The method of claim 1 wherein each of the plurality of collections of related POIs contains a plurality of locations of a different chain.

3. The method of claim 2 wherein said step b) is performed by selecting from among a plurality of icons, each representing the chain associated with the associated collection.

4. The method of claim 3 further including the steps of writing the selected collection of related POIs to a portable media device and, in said step d), accessing the portable media device.

5. The method of claim 4 further including the step of determining a route to the specific address of the chosen POI.

6. The method of claim 1 wherein the plurality of collections of related POIs each contain a plurality of locations related to a different event.

7. The method of claim 6 wherein the plurality of locations are related to a different one-time event occurring in proximity to the plurality of locations.

8. A user interface for use with a navigation system comprising:
    a server accessible over a wide area network;
    the server storing a plurality of collections of points of interest (POIs), each collection having an associated chain, each collection containing only POIs that are locations of the associated chain, each location having a specific physical location;
    the server communicating an identifier of the chain associated with each collection so that a user can select a collection based upon the associated chain, the server transmitting a selected one of the collections of POIs based upon selection by the user; and
    a first interface, wherein the user can store a selected POI having said specific physical location to an itinerary on the server having a plurality of trip locations, wherein the itinerary from the server, having the plurality of trip locations and the selected POI, is stored on a portable media device such that the navigation system determines a route by accessing one of the selected POI stored on the portable media device.

9. The user interface of claim 8 wherein the server communicates the identifier by communicating a logo associated with the chain.

10. The user interface of claim 8 further including a navigation system, the selected one of the collections of POIs being readable by the navigation system, the navigation system being programmed to permit the user to select another POIs from the selected one of the collections of POIs, the navigation system then determining a route to the selected POI.

11. The user interface of claim 10 including the portable media device that the user can download the selected collection onto and from which the navigation system can access the selected collection.

12. The user interface of claim 10 wherein the plurality of collections is a plurality of first collections, the user interface further including a plurality of second collections of POIs each associated with an event, each of the POIs in each second collection associated with the event associated with the associated second collection of the POI.

13. The user interface of claim 12 wherein the event with which each of the second collections is associated is a one-time event.

14. The method of claim 1, wherein the POI is not stored in a map of the navigation system.

15. The method of claim 14, wherein the navigation system identifies the selected POI by the specific physical location.

16. The method of claim 1, wherein the selected POI is identified prior to connecting the portable media device to the navigation system.

17. The method of claim 1, wherein the navigation system identifies a POI from a predetermined group of locations consisting of locations associated with a POI stored on the portable media device.

18. A method for operating a navigation system including the steps of:

a) connecting to a remote server over a network;
b) selecting from among a plurality of collections of related points of interest (POIs), wherein each POI is associated with a specific physical location;
c) transmitting the selected collection of related POIs with specific physical locations from the remote server;
d) creating at least one tab, each tab using at least one POI from the selected collection of related POI;
e) downloading contents of the at least one tab to a portable media device;
f) accessing the contents of the at least one tab with a navigation system; and
g) choosing the contents of one of the tabs.

19. The method of claim 18, wherein step e) includes downloading the selected collection of related POI's to the portable media device.

20. The method of claim 18, including the step of saving contents of at least one of the at least one tab on the server.

21. The method of claim 20, wherein the navigation system transmits the contents of the at least one tab to the portable media device.

22. The method of claim 21, wherein the portable media device transmits the contents of the at least one tab of the navigation system to the server for saving.

23. The method of claim 1, wherein step b) further comprises selecting from the plurality of POIs having a predetermined physical address.

24. The method of claim 18, wherein step d) further comprises downloading without determining a route.

25. The method of claim 1, wherein at least one of step b) and step c) are performed by a driver of a rental car.

26. The method of claim 25, wherein both step b) and step c) are completed prior to entering the rental car.

* * * * *